April 6, 1937.  H. V. SHEBAT  2,076,254
BEARING
Filed Sept. 9, 1932
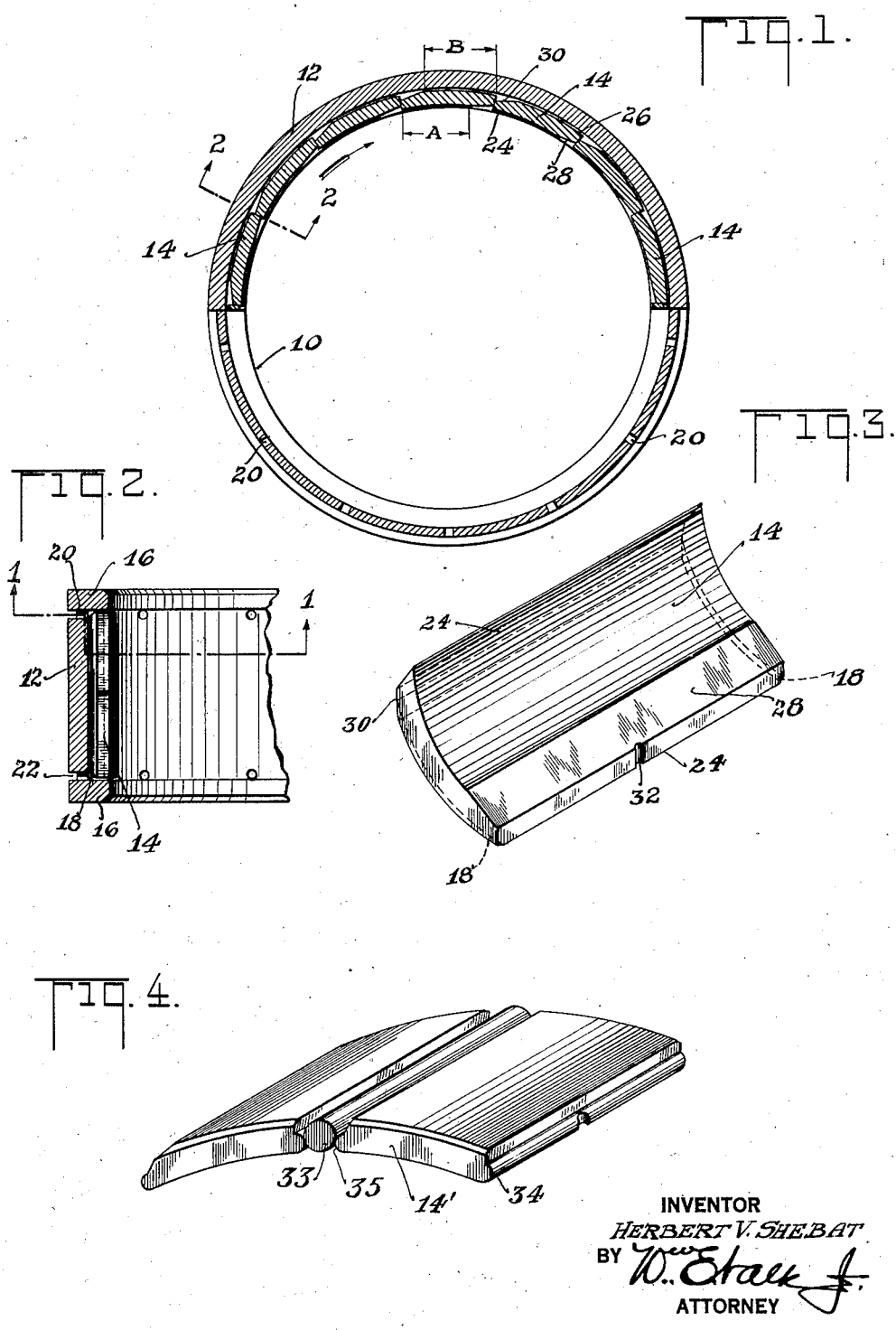
INVENTOR
HERBERT V. SHEBAT
BY
ATTORNEY Patented Apr. 6, 1937

2,076,254

UNITED STATES PATENT OFFICE 2,076,254

BEARING

Herbert V. Shebat, Little Falls, N. J., assignor, by mesne assignments, to The Reed Propeller Co., Inc., Garden City, N. Y., a corporation of New York Application September 9, 1932, Serial No. 632,343

2 Claims. (Cl. 308—73)

This invention relates to lubricated bearings, and is more particularly concerned with the provision of an improved type of bearing wherein segmental blocks are interposed between a journal and a bearing shell which, by their conformation, improve the lubrication of the bearing, enabling it to sustain a high order of bearing loads.

In the past, floating bushings interposed between a journal and bearing shell have been used for increasing the ability of the bearing to sustain greater loads. The prior art also shows bearings having segmental portions within a journal and bearing shell for assisting in entraining lubricating oil between the bearing shell and the segments, but such bearings have only provided a single bearing surface between the segments and the bearing shell.

It is an object of this invention to provide a construction wherein the segmental blocks between the journal and bearing shell are free to rotate with respect to the journal and the shell, and at the same time to provide by their conformation means for entraining the oil at their inner and outer bearing surfaces, whereupon higher pressures may be imposed upon the bearing. The prior art also provides for thrust bearings wherein flat faced segmental blocks supported on pivotal seats behind their center of width allow the blocks to oscillate slightly and to present a portion of their surface to the lubricating oil and to the thrust bearing, enabling oil to be entrained and enabling an extremely high intensity of pressure to be imposed upon the bearing as a whole.

In attempting to apply this pivoted block principle to cylindrical bearings, undesirable complications arise, since the pivoted segments above mentioned cause the bearing as a whole to become bulky, heavy and complicated.

An object of the present invention is to provide a simplified form of cylindrical bearing using floating segmental blocks between the journal and bearing shell. A further object is to provide such a bearing wherein the floating segmental blocks are formed to assist in the lubrication of the bearing to enable the bearing to withstand high pressures. A further object is to provide a new form of segmental bearing wherein the objects above set forth are obtained by a simplified construction, permitting the use of a plain cylindrical journal and housing.

Further objects will be apparent from a reading of the subjoined specification and claims and from a consideration of the accompanying drawing, in which:

Fig. 1 is a transverse section showing the bearing of this invention in section on the line 1—1 of Fig. 2;

Fig. 2 is a fragmentary section on the line 2—2 of Fig. 1;

Fig. 3 is a perspective view of one of the bearing segments of Fig. 1; and

Fig. 4 is a perspective view indicating that rollers may be used as spacers between the segments.

Referring to Fig. 1, 10 represents the outer surface of a cylindrical journal or shaft, supported within a bearing shell 12. Interposed between the journal 10 and the shell 12 are a series of segmental blocks 14. It will be noted that the journal 10 and the bearing shell 12 are of simple cylindrical shape. The bearing shell 12 will be seen in Fig. 2 to be provided with lips or flanges 16 projecting inwardly at either end of the bearing shell 12 for the axial restraint of the segments 14. Each segment or segmental block 14 is provided at its exterior corners with a chamfer 18, which, with the corner formed by the bearing shell 12 and the lip 16, form annular channels for the distribution of oil. Openings 20 are formed in the shell 12 and are joined by an annular groove 22 circumscribing the shell 12. These grooves 22 in conjunction with the exterior housing (not shown) of the shell 12, in conjunction with suitable oil ducts within the housing, allow the injection of oil within the bearing.

Each segment 14 is provided with relieved portions 28 and 30 at its alternate corners, the relieved portion extending a substantial distance from the end of the segment toward the center of the segment. This provides an actual bearing contact area on the inner surface of the segment as represented by the dimension A, and provides a bearing contact area on the external surface of the segment indicated by the dimension B. It will be noted, by the alternate formation of the relieved portions 28 and 30, that the bearing contact areas A and B will be offset with relation to each other.

The direction of rotation of the shaft or journal 10 is represented by the arrow. It will be seen that the floating segments 14 will tend to turn with and with respect to the journal shaft and will tend to turn with respect to the bearing shell 12. In other words, the segments 14 will creep at approximately one-half the rotational speed of the shaft 10. The relief portions 28 and 30 of the blocks 14 form the trailing edges of the segments 14 as they move, while the "toe" portions 24 and 26 of the segments 14 will form the leading edges of the segments 14 as they move. It will be noted that the toe portion 24 bearing on the shaft 10 is unsupported at the opposite side of the segment due to the relief 30, and the toe portion 26 bearing against the bearing shell 12 is unsupported, due to the relief 28.

The offset relation of the inner and outer bearing surfaces of the segment 14 will result in a high intensity of pressure toward the mid-portion of the segment and will allow a relatively low intensity of pressure at the toes 24 and 26. Hence, when oil is fed to the bearing, the toe portions 24 and 26, being under a relatively lower degree of pressure, will entrain oil at those points. Upon such entraining of oil, the segment 14 will be rocked slightly about its transverse axis, resulting in a very high pressure intensity adjacent the "heel" of each bearing surface. Upon rotation of the shaft, however, oil is constantly wedged under the toes 24 and 26 and is worked rearwardly along the segment so that oil is forced by said wedging action into the high pressure zones previously mentioned. It is thus seen that the leading edges or toes 24 and 26 of the segments 14 constantly tend to climb up on the oil film and generate in the oil film sufficient pressure to keep the surfaces from metallic contact.

To further assist in the distribution of oil throughout the bearing, radially disposed notches as 32 are provided in the abutting faces of the segments 14, allowing oil to pass from the exterior housing (not shown), through the annuli 22, through the openings 20, across the relieved portion 30, through the notch 32, whereupon it is distributed by the relief 28 across the leading edge of the next adjacent segment.

It will be seen that the necessary pressure distribution, whereby the highest pressure intensity occurs at the heel of each working surface of each segment, is realized in a very simple manner and without recourse to complicated machining practice. It will also be seen that the segments as an assembly are free to float rotationally, thus permitting the amount of sliding to be distributed between inner and outer segment surfaces in proportion to the excellence of the oil film condition.

Fig. 4 represents an alternative embodiment of the invention, wherein rollers 33 are interposed between adjacent segmental blocks 14'. The blocks 14' are provided at their leading and trailing edge faces with rounded portions 34 and 35 against which the rollers 33 may rotate. In such alternative construction, the rollers 33 will be constructed with a slightly larger diameter than the thickness of the segmental blocks 14' so that the rollers 33 can positively move the blocks 14' as the shaft rotates with respect to the bearing shell, to assist in inducing the rocking and wedging action previously described for supporting the major bearing loads on the blocks 14'.

A bearing of the type described may be used to advantage in an internal combustion engine wherein the requirements of different portions of the mechanism for lubricating oils of different body or viscosity may be more properly balanced so that flood lubrication with one body or viscosity of lubricating oil may be efficiently used. Normally, the reciprocating parts such as pistons of an internal combustion engine, require oil of considerable body or viscosity to properly withstand temperature conditions imposed upon them, whereas such an oil is frequently of such heavy body that immediate circulation of the oil through the small clearance space of the usual bearing is difficult of attainment when the engine is started. Particularly in cold weather operation, it is possible for the engine to operate for several minutes before a complete film is established through the small clearance spaces in the cylindrical bearings. This, of course, might cause scoring or premature wear of the bearing surfaces. By the self-induced wedging action of the bearing above described, along with generous channels for the normal flow of oil, such a condition would be eliminated. Oil could immediately flow to all ducts within the bearing and immediately upon rotation of the shaft within the bearing, full film lubrication would be induced. Likewise, in the usual force-feed lubricating system, wherein spray formed by the bleeding of oil from a whirling crankshaft serves to lubricate the cylinder walls, the free passage of oil through the channels of this bearing will allow for such bleeding immediately upon starting the engine, eliminating a "dry" period when the oil is completing the full film between the bearing surfaces prior to bleeding for lubrication of other parts.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. A bearing comprising spaced races having opposed bearing surfaces, and a plurality of individually rockable bearing segments lying between said surfaces, each said segment being rotationally floatable and having, on its opposite sides and adjacent to the trailing edge of each said side, a relieved non-bearing portion whereby, in operation, the load pressure distribution on each segment is such that a lesser intensity of pressure is induced at the leading edge of each side of each said segment than is induced at the trailing edge thereof.

2. A bearing comprising spaced races having opposed bearing surfaces, and a plurality of individually rockable bearing segments lying between said surfaces, each said segment being rotationally floatable and having, on its opposite sides and adjacent to the trailing edge of each said side, a relieved non-bearing portion whereby, in operation, the load pressure distribution on each segment is such that a lesser intensity of pressure is induced at the leading edge of each side of each said segment than is induced at the trailing edge thereof, the relieved non-bearing portion at one side of each said segment lying directly opposite to the leading edge at the opposite side of the same said segment and vice versa so as to admit thereby of an increase in the magnitude of the pressure induced rocking couple.

HERBERT V. SHEBAT.